United States Patent [19]

Kawashita et al.

[11] Patent Number: 4,605,442
[45] Date of Patent: Aug. 12, 1986

[54] AQUEOUS INK COMPOSITION

[75] Inventors: Hideo Kawashita, Ibaraki; Takuo Ikeda, Yawata; Sanae Sakaguchi, Nishinomiya, all of Japan

[73] Assignee: Taoka Chemical Company, Limited, Osaka, Japan

[21] Appl. No.: 742,275

[22] Filed: Jun. 7, 1985

[30] Foreign Application Priority Data

Jun. 14, 1984 [JP] Japan .................... 59-123290

[51] Int. Cl.$^4$ .................................................. C09D 11/02
[52] U.S. Cl. .................................................. 106/22
[58] Field of Search ............... 106/22, 20; 524/551, 524/554, 561

[56] References Cited

PUBLICATIONS

Chemical Abstracts, vol. 79, No. 137925f, Suzuki et al, Japanese Patent Kokai No. 73-50,083, Jul. 14, 1973.

*Primary Examiner*—Amelia B. Yarbrough
*Attorney, Agent, or Firm*—Wegner & Bretschneider

[57] ABSTRACT

An aqueous ink composition comprising an dyestuff, a wetting agent and water, characterized in that said dyestuff is a compound of the formula:

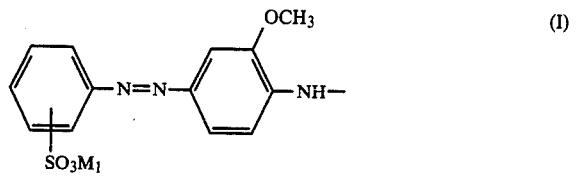

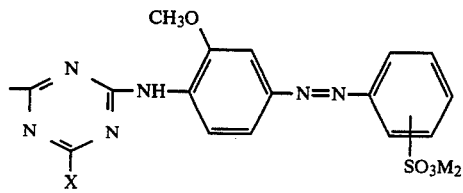

wherein $M_1$ and $M_2$ are, the same or different, each a hydrogen atom, an alkali metal atom, an ammonium group or an organic ammonium group and X is an alkylamine or alkoxyalkylamine residue having 6 to 18 carbon atoms. Said ink composition is improved in storage stability, jet stability, image clarity, water resistance, etc.

10 Claims, No Drawings

AQUEOUS INK COMPOSITION

The present invention relates to an aqueous ink composition suitable for printing, writing, recording, stamping, etc. More particularly, it relates to an aqueous ink composition for ink jet recording, which can provide an excellent yellowish image without causing any clogging in an nozzle even when used intermittently over a long period of time.

In general, conventional aqueous ink compositions basically comprise a dyestuff, a polyvalent alcohol or its ether as a wetting agent and water. In order to achieve good ink jet recording, these conventional ink compositions are required to have various properties. They should have appropriate values in viscosity, surface tension, specific electric conductivity, density, etc. so as to adequately form droplets and control jetting directions of the droplets. Further, they should not form any precipitation on the storage, the use or the rest over a long period of time. Furthermore, any significant variation in the physical properties should not occur.

The outlet of a nozzle for a recording device has, in general, a diameter of 10 to 60 microns, and any precipitation within the nozzle prevents the jetting of aqueous droplets of ink from the nozzle. Even if the nozzle is not completely clogged, it is likely to produce solid or viscous materials around the outlet of the nozzle, which leads to the depression of the physical property of the ink composition so designed as it falls within a desired range, whereby deterioration of the recording ability as well as the stability or response in jetting will be caused. Still, the printed image as recorded must have not only sufficiently high contrast and clarity but also water resistance, light resistance, wear resistance, etc.

As the yellow dyestuff for the aqueous ink composition, conventionally employed are direct dyes and acid dyes which are water soluble and excellent in water resistance and light resistance. Examples of such yellow dyestuff are C.I. Direct Yellow 12, 27, 33, 39, 50, 58, 85, 86, 88, 100, 110 and C.I. Acid Yellow 7, 17, 23, 29, 42, 99, etc.

Since said conventional direct dyes have, however, such a disadvantage as low solubility, a sufficient image concentration and contrast are not expected to a satisfactory degree. Besides, said dyes agglomerate and precipitate in storage or in use over a long period of time and are apt to produce the clogging in the nozzle. In order to overcome these drawbacks as seen in the conventional yellow dyestuffs, it has been proposed to incorporate into the aqueous ink composition an additive such as an organic amine or a surface active agent as a solubilizer. These additives, however, corrode various parts of the recording device and may invite cloggings in the nozzle due to bubbling of the ink liquid, whereby the printed image is not sufficiently clear. On the other hand, the use of the conventional acid dyes may enhance the color tone but their printed image is insufficient, particularly in water resistance, so that the use of a specific paper for recording is necessary.

Under the current circumstances, it is highly desired to provide a dyestuff suitable for the aqueous ink composition, particularly for ink jet recording, which has excellent solubility and storage stability without causing the clogging of the nozzle and can provide an excellent image of water resistance and light resistance.

The object of the present invention is to provide an aqueous ink composition, particularly for ink jet recording, comprising a dyestuff, a wetting agent and water, characterized in that said dyestuff is a compound of the formula:

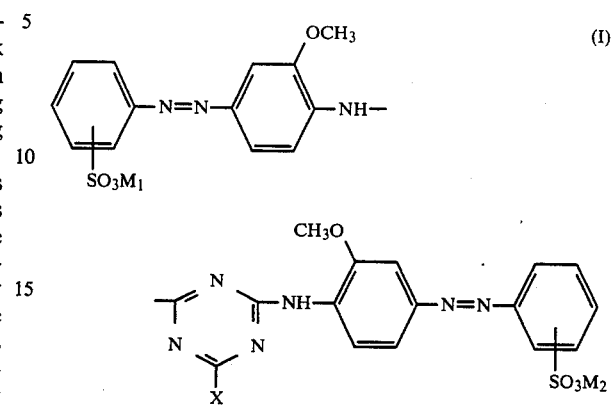

wherein $M_1$ and $M_2$ are, the same or different, each a hydrogen atom, an alkali metal atom, an ammonium group or an organic ammonium group and X is an alkylamine or alkoxyalkylamine residue having 6 to 18 carbon atoms.

Examples of the $C_6$–$C_{18}$ alkylamine or alkoxyalkylamine corresponding to the residue represented by the symbol X are hexylamine, 2-ethylbutylamine, diisopropylamine, heptylamine, octylamine, N,N-dibutylamine, N-ethyl-N-hexylamine, 2-ethylhexylamine, nonylamine, diamylamine, dodecylamine, dioctylamine, cetylamine, stearylamine, methoxyhexylamine, propoxybutylamine, butoxyhexylamine, hexyloxyethylamine, 2-ethylhexyloxypropylamine, etc. Preferred are alkylamines of 8 to 13 carbon atoms and alkoxyalkylamines of 7 to 12 carbon atoms. As the organic amine corresponding to the organic ammonium group represented by the symbol $M_1$ or $M_2$, there may be exemplified $C_6$–$C_{18}$ alkylamines and $C_6$–$C_{18}$ alkoxyalkylamines as above mentioned. Other organic amines such as $C_1$–$C_5$ alkylamines, $C_1$–$C_5$ alkoxyalkylamines, $C_1$–$C_5$ alkanolamines, aniline, benzylamine and cycloalkylamines are also usable. Among them, preferred are monoethanolamine, diethanolamine, triethanolamine, etc. Examples of the alkali metal atom represented by the symbol $M_1$ or $M_2$ are sodium, potassium, lithium, etc. The groups —$SO_3M_1$ and —$SO_3M_2$ may be located at any position on the benzene ring but are preferred to be each present at the m-position to the azo group.

When the alkylamine or alkoxyalkylamine residue represented by the symbol X has less than 6 carbon atoms, purification of the dyestuff (I) is difficult, and the dyestuff has too large solubility in water and is inferior in affinity to the wetting agent. Due to these reasons, it causes clogging of the nozzle, and the water resistance of the image is deteriorated. When said alkylamine or alkoxyalkylamine residue has more than 18 carbon atoms, the dyestuff is inferior in affinity to water and to the wetting agent so that a plenty amount of the wetting agent is required to prepare the ink compositon. Yet, the image density is not increased, and almost all the properties such as storage stability and nozzle clogging are not satisfactory.

The dyestuff (I) to be used in the ink composition of the invention may be prepared, for instance, by coupling aniline-sulfonic acid with orthoanisidine according to a conventional procedure to form a monoazo dye. The thus obtained monoazo dye and cyanuric halide are condensed in a molar ratio of 2:1, followed by reaction with an alkylamine or alkoxyalkylamine corresponding to the residue X in the dyestuff (I). Since the dyestuff (I) is inherently poorly soluble in water, it can be easily separated from impurities such as inorganic salts by-produced during the reaction so as to recover a high purity of the product.

The wetting agent may be the one as conventionally employed for aqueous ink compositions, and particularly a heat-stable one is preferred. Examples of such wetting agent are polyvalent alcohols, cellosolves, carbitols, etc. Specifically, there are exemplified ethylene glycol, diethylene glycol, triethylene glycol, propylene glycol, glycerol, polyethylene glycol, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, etc. Among them, particularly preferred are polyethylene glycol, butylcarbitol, glycerol, etc. Their combinations such as polyethylene glycol and carbitol are also preferred. In addition, any solubilizing agent for dyestuff as conventionally employed may be incorporated. Examples of the solubilizing agent are dimethylformamide, pyrrolidone, alcohols, alkanolamines, etc.

In the ink compositon of the invention, the amount of the dyestuff (I) is usually from 0.5 to 20 parts by weight, preferably from 1 to 15 parts by weight to 100 parts by weight of the ink compositon. When the amount of the dyestuff (I) is less than 0.5 part by weight, the color is too light, and when it is more than 20 parts by weight, precipitation tends to form on the storage over a long time. Usually, the dyestuffs (I) develop yellow, and may be used alone or in combination. In addition, any dyestuff used in conventional aqueous ink compositions may be incorporated into the ink compositon of the invention in such amount that the characteristic properties of the dyestuff (I) are not deteriorated.

The wetting agent is used in an appropriate amount so as to impart the characteristic properties desired for a recording vehicle to the ink composition. Its amount may be preferably from 1 to 80 parts by weight to 100 parts by weight of the ink composition. Usually, one kind of the wetting agent is used, but two or more kinds of the wetting agents may be used insofar as they do not adversely affect each other.

In order to provide the ink composition of the invention with additional characteristic properties, there may be incorporated other conventional additives. Specific examples of such additives are antiseptics or fungicides (e.g., sodium dehydroacetate, 2,2-dimethyl-6-acetoxydioxane, ammonium thioglycollate, etc.), rust preventives (e.g., acid sulfites, sodium thiosulfate, dicyclohexylammonium nitrite, etc.), UV light absorbers, viscosity modifiers, surfactants, pH adjustors, specific resistance adjustors, IR light absorbers and the like.

Unlike conventional dyestuffs, the dyestuff (I) is characteristic in that it is poor in water solubility and yet improved in affinity to polyvalent alcohols, cellosolves and carbitols. Therefore, it can be used in a variety of aqueous ink compositions and preserve a solution state with a high stability against the variation of the composition produced during the storage or the use. In addition, the dyestuff (I) is easily isolated with high purity from the by-producted inorganic materials so that the image recorded by the dyestuff (I) has high density and clarity.

The present invention will be hereinafter explained further in detail by the following Examples wherein part(s) are by weight unless otherwise indicated.

EXAMPLES 1 to 12 and COMPARATIVE EXAMPLES 1 to 3

The dyestuff (I) shown in Table 1 was thoroughly mixed with the components as shown in Table 2, and the resultant mixture was sufficiently stirred at 50° C. and filtered under pressure by the aid of a membrane filter (0.5 micron) to obtain an ink composition for recording, of which storage stability, jet stability and image clarity were measured. The measurements were carried out as follows:

(1) Storage stability

The ink composition was sealed in a Pyrex-made test tube and allowed to stand at 0° C. or 50° C. for one month, whereafter precipitation was observed, and evaluation was made according to the following criteria:

: no precipitation
: scarce precipitation
Δ: little precipitation
x: many precipitation.

(2) Jet stability

The ink composition was charged in an ink jet recording device provided with a nozzle of 30 microns in diameter and jetted for 24 hours, during which jetting was effected with cycles of which each consisted of one second jetting and one second rest. After the jetting was stopped, the ink composition was allowed to stand at room temperature for 10, 20, 30, 60 or 90 days and again subjected to jetting, at which observation was made on whether clogging was produced. The jet stability was represented by the maximum number of days for which re-jetting could be made without clogging.

(3) Image clarity

The ink composition was jetted for recording by the use of the same device as in (2) above, and the image clarity on the recording was visually observed and evaluation was made according to the following criteria:

: excellent
: normal
Δ: not sufficient
x: poor.

As understood from the results in Table 2, it is clear that the ink composition of the invention gives an enhanced yellowish image, can be stored stably over a long period of time and is improved in nozzle clogging in comparison with the conventional ink composition.

TABLE 1

| Dye-stuff No. | Compound (I) SO₃M₁ Position* | M₁ | X | SO₃M₂ Position* | M₂ |
|---|---|---|---|---|---|
| A | m | Na | NHCH₂CH(C₂H₅)(CH₂)₃CH₃ | m | Na |
| B | p | K | " | p | K |
| C | o | Li | " | o | Li |
| D | m | NH₄ | " | m | NH₄ |
| E | m | Na | NHCH₂(CH₂)₆CH₃ | m | Na |
| F | m | NH₃C₆H₁₃ | NHCH₂(CH₂)₄CH₃ | m | NH₃C₆H₁₃ |
| G | m | NH₃CH₂CH₂OH | NHCH₂(CH₂)₆CH₃ | m | NH₃CH₂CH₂OH |
| H | m | Na | NH(CH₂)₃OCH₂CH(C₂H₅)(CH₂)₃CH₃ | m | Na |
| I | m | K | NH(CH₂)₂OCH₂(CH₂)₄CH₃ | m | K |
| J | m | Na | NHCH₂(CH₂)₁₀CH₃ | m | Na |
| K | m | Na | N[CH₂(CH₂)₃CH₃]₂ | m | Na |
| L | m | Na | NHCH₂(CH₂)₁₄CH₃ | m | Na |
| M | m | Na | Cl | m | Na |
| N | m | Na | NHC₂H₅ | m | Na |
| O | m | Na | NHCH₂(CH₂)₅CH₂OH | m | Na |

Note:
*position to the azo group.

TABLE 2

| | | | Example | | | | | | | | | | | Comparative | | |
|---|---|---|---|---|---|---|---|---|---|---|---|---|---|---|---|---|
| | | No. | 1 | 2 | 3 | 4 | 5 | 6 | 7 | 8 | 9 | 10 | 11 | 12 | 1 | 2 | 3 |
| Dyestuff | Amount (part(s)) | | A 3.5 | B 3.5 | C 3.5 | D 3.5 | E 3.5 | F 3.5 | G 3.5 | H 3.5 | I 3.5 | J 3.5 | K 3.5 | L 3.5 | M 3.5 | N 3.5 | O 3.5 |
| Component | Ethylene glycol | | 20 | 20 | 20 | 20 | 20 | 15 | 25 | 20 | 20 | 10 | 10 | — | 15 | 15 | 15 |
| | Diethylene glycol | | — | — | — | 5 | — | — | — | — | 10 | — | — | 20 | — | — | — |
| | Polyethylene glycol #400 | | 10 | 10 | 10 | 10 | 10 | 20 | 10 | — | — | 20 | — | — | 20 | 20 | 20 |
| | Glycerol | | — | — | 5 | — | — | — | — | 5 | — | 20 | — | — | — | — |
| | Ethel cellosolve | | 10 | 10 | 10 | — | — | — | 10 | — | — | 10 | — | 15 | — | 10 | 10 |
| | Methyl carbitol | | — | 10 | — | 10 | — | 10 | — | — | 15 | — | 25 | — | — | — | — |
| | Butyl carbitol | | 10 | — | — | — | 10 | — | 10 | 40 | 10 | — | — | 30 | — | — | — |
| | N—Methyl-2-pyrrolidone | | — | — | — | — | 2 | 2 | — | — | — | 2 | 2 | 2 | — | — | — |
| | Ion-exchange water | | 46.5 | 46.5 | 51.5 | 51.5 | 54.5 | 49.5 | 41.5 | 36.5 | 36.5 | 54.5 | 39.5 | 29.5 | 61.5 | 51.5 | 51.5 |
| Test item | Storage stability | | | | | | | | | | | | | | | | |
| | 0° C. | | | | | | | o | o | | | | | | Δ | o | o |
| | 50° C. | | | | | | | o | o | | | o | o | o | Δ | Δ | Δ |
| | Jet stability (days) | | 90 | 90 | 90 | 90> | 90 | 90> | 90> | 90< | 90 | 90> | 90> | 90> | 20 | 30 | 30 |
| | Image | | | | | | | | | | | | | | | | |
| | Clarity | | | | | | | o | | | | | | | Δ | o | o |
| | Tone | | | | | | | Yellow | | | | | | | Yellow | | |

What is claimed is:

1. An aqueous ink composition comprising a dyestuff, a wetting agent and water, characterized in that said dyestuff is a compound of the formula:

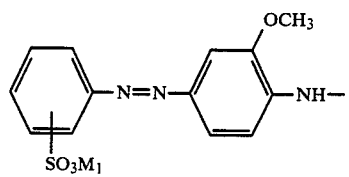

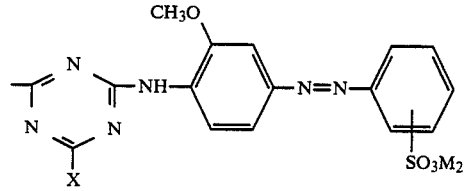

wherein $M_1$ and $M_2$ are, the same or different, each a hydrogen atom, an alkali metal atom, an ammonium group or an organic ammonium group and X is an alkylamine or alkoxyalkylamine residue having 6 to 18 carbon atoms.

2. The composition according to claim 1, wherein each of the groups —SO₃M₁ and —SO₃M₂ is present at the m-position to the azo group.

3. The composition according to claim 1, wherein X is an alkylamine residue having 8 to 13 carbon atoms.

4. The composition according to claim 1, wherein X is an alkoxyalkylamine residue having 7 to 12 carbon atoms.

5. The composition according to claim 1, wherein the alkali metal atom is sodium, potassium or lithium.

6. The composition according to claim 1, wherein the organic ammonium group is the one originated from monoethanolamine, diethanolamine or triethanolamine.

7. The composition according to claim 1, wherein each of the groups —SO₃M₁ and —SO₃M₂ is present at the m-position to the azo group, X is an alkoxyalkylamine residue having 7 to 12 carbon atoms and the alkali metal atom is sodium.

8. The composition according to claim 1, wherein the wetting agent is polyethylene glycol, butylcarbitol or glycerol.

9. The composition according to claim 1, wherein each of the groups —$SO_3M_1$ and —$SO_3M_2$ is present at the m-position to the azo group, X is an alkoxyalkylamine residue having 7 to 12 carbon atoms and the alkali metal atom is sodium, and the wetting agent is polyethylene glycol or a mixture of polyethylene glycol and butylcarbitol.

10. The composition according to claim 1, wherein the dyestuff and the wetting agent are respectively in amounts of from 0.5 to 20 parts by weight and 1 to 80 parts by weight to 100 parts by weight of the composition.

* * * * *

UNITED STATES PATENT AND TRADEMARK OFFICE
CERTIFICATE OF CORRECTION

PATENT NO. : 4,605,442

DATED : August 12, 1986

INVENTOR(S) : Hideo KAWASHITA et al.

It is certified that error appears in the above-identified patent and that said Letters Patent is hereby corrected as shown below:

On the title page:
After "(73) Assignee:" information, insert --Co-Assignee: Sumitumo Chemical Company Limited, Osaka, Japan--

Signed and Sealed this

Thirtieth Day of December, 1986

Attest:

DONALD J. QUIGG

*Attesting Officer*  *Commissioner of Patents and Trademarks*